(12) United States Patent
Fayyad et al.

(10) Patent No.: US 7,424,439 B1
(45) Date of Patent: Sep. 9, 2008

(54) DATA MINING FOR MANAGING MARKETING RESOURCES

(75) Inventors: Usama M. Fayyad, Mercer Island, WA (US); Bassel Y. Ojjeh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/401,439

(22) Filed: Sep. 22, 1999

(51) Int. Cl.
G06F 17/30 (2006.01)
(52) U.S. Cl. .......................................... 705/10
(58) Field of Classification Search ............... 705/7, 705/10, 14; 707/1, 100, 5
See application file for complete search history.

(56) References Cited

U.S. PATENT DOCUMENTS

| | | | | |
|---|---|---|---|---|
| 5,613,041 A * | 3/1997 | Keeler et al. | ............. | 706/17 |
| 5,787,274 A | 7/1998 | Agrawal et al. | ............. | 707/102 |
| 5,794,209 A * | 8/1998 | Agrawal et al. | ............. | 705/10 |
| 5,799,311 A | 8/1998 | Agrawal et al. | ............. | 707/102 |
| 5,870,735 A | 2/1999 | Agrawal et al. | ............. | 707/3 |
| 5,968,125 A * | 10/1999 | Garrick et al. | ............. | 709/224 |
| 5,991,735 A * | 11/1999 | Gerace | ............. | 705/10 |
| 6,026,397 A * | 2/2000 | Sheppard | ............. | 707/2 |
| 6,061,658 A * | 5/2000 | Chou et al. | ............. | 705/10 |
| 6,134,532 A * | 10/2000 | Lazarus et al. | ............. | 705/14 |
| 6,154,739 A * | 11/2000 | Wrobel | ............. | 707/100 |
| 6,212,526 B1 | 4/2001 | Chaudhuri et al. | ............. | 707/102 |
| 6,240,411 B1 * | 5/2001 | Thearling | ............. | 707/5 |
| 6,260,036 B1 * | 7/2001 | Almasi et al. | ............. | 707/10 |
| 6,286,005 B1 * | 9/2001 | Cannon | ............. | 707/100 |
| 6,317,752 B1 * | 11/2001 | Lee et al. | ............. | 707/104.1 |
| 6,334,110 B1 * | 12/2001 | Walter et al. | ............. | 705/14 |
| 6,374,251 B1 * | 4/2002 | Fayyad et al. | ............. | 707/101 |
| 6,430,539 B1 * | 8/2002 | Lazarus et al. | ............. | 705/10 |
| 6,449,612 B1 * | 9/2002 | Bradley et al. | ............. | 707/6 |
| 6,493,637 B1 * | 12/2002 | Steeg | ............. | 702/19 |
| 6,571,279 B1 * | 5/2003 | Herz et al. | ............. | 709/217 |
| 6,760,727 B1 * | 7/2004 | Schroeder et al. | ............. | 707/10 |
| 2001/0013009 A1 * | 8/2001 | Greening et al. | ............. | 705/10 |

OTHER PUBLICATIONS

Fayyad, Usama. "The KDD process for extracting useful knowledge from volumes of data," Association for Computing Machinery. Communications of the ACM, Nov. 1996 [retrieved from Proquest].*

Filipczak, Bob. "Data-mining: 16 tons and what do you get?" Training, Mar. 1998 [retrieved from Proquest.*

(Continued)

*Primary Examiner*—C. Michelle Tarae

(57) ABSTRACT

Data mining for managing marketing resources is disclosed. In one embodiment, a method for managing a marketing campaign includes the following. First, the method provides a data mining engine capable of being trained with training data and capable thereof of performing inference relative to the training data and on future data. Next, the method provides a user database defining observed characteristics of each one of a set of users. The characteristics include at least one of one or more user's attributes, and one or more of the user's preferences. Finally, the data mining engine is trained with a set of training data comprising the user data base, and a predetermined characteristic pertaining to the market campaign is input to the engine, such that, in response to the input, a subset of the users in the database is obtained that have the highest correlation to the characteristic.

12 Claims, 12 Drawing Sheets

OTHER PUBLICATIONS

Mena, Jesus. "How to mine data in the Web. (includes related article on data collection techniques) (Drilling for Data) (Internet/Web/Online Service Information)(Cover Story)," Databased Web Advisor, Jul. 1997.*

Heckerman, David. "Bayesian Networks for Data Mining," Data Mining and Knowledge Discovery, 1997.*

Ling et al. "Data Mining for Direct Marketing," Department of Computer Science The University of Western Ohio, 1998.*

Article from American Association for Artificial Intelligence entitled "From Digitized Images to Online Catalogs", by Usama M. Fayyad, S.G. Djorgovski and Nicholas Weir, Summer 1996, pp. 51-66.

Article from New Scientist entitled "Planning for data", by Robert Matthews, May 25, 1996, pp. 30-33.

Article from IEEE Expert entitled "Data Mining and Knowledge Discovery: Making Sense out of Data", by Usama F. Fayyad, Aug. 1996, pp. 1-9.

Article from EDBT Conference entitled "SLIQ: A Fast Scalable Classifier for Data Mining", by Manish Mehta, Rakesh Agrawal and Jorma Rissanen, dated 1996, 15 pgs.

* cited by examiner

FIG 5

| CLUSTER | ADVERTISEMENT FEATURE | CLICK-THROUGH PERCENTAGE |
|---|---|---|
| | | |
| | | |
| | | |

FIG 6

| CLUSTER | PRODUCT | CLICK-THROUGH PERCENTAGE |
|---|---|---|
| | | |
| | | |
| | | |

FIG 7

| CLUSTER | SHOPPING EXPERIENCE FEATURES | CLICK-THROUGH PERCENTAGE |
|---|---|---|
| | | |
| | | |
| | | |

FIG 8

| CLUSTER | CATALOG FEATURES | CLICK-THROUGH PERCENTAGE |
|---|---|---|
|  |  |  |
|  |  |  |
|  |  |  |

FIG 9

| CLUSTER | STORE FRONT FEATURES | CLICK-THROUGH PERCENTAGE |
|---|---|---|
|  |  |  |
|  |  |  |
|  |  |  |

FIG 13

| USER 'X' ||
|---|---|
| CLUSTER | PROBABILITY |
| 5 | 65% |
| 7 | 46% |
| 3 | 40% |
| 9 | 38% |

DATA MINING FOR MANAGING MARKETING RESOURCES

FIELD OF THE INVENTION

The invention relates generally to data mining, and more particularly to data mining for managing marketing resources.

BACKGROUND OF THE INVENTION

Marketing of products and services is conducted over several different types of channels, including mail, electronic mail, radio, television and telemarketing. Different types of channels are suitable for different types of marketing campaigns. For example, mail and electronic mail is generally used for direct mailing campaigns. Promotions and advertising are conducted on television, radio, print media as well as the Internet. In particular, web sites often carry paid advertising.

While marketing on the Internet would appear to offer the greatest potential for technical advances, the present techniques employed to evaluate marketing on the Internet are no faster than ordinary techniques employed in evaluating advertising/marketing in conventional media (e.g., television and radio). Generally, the marketing manager (or, on the Internet, the site manager) employs an independent marketing company to run a marketing campaign and then collect the results and provide an evaluation. The turn-around time for such an evaluation often can be several months following the completion of the marketing or advertising campaign. The marketing company uses any one of several well-known databases characterizing a large population of purchasers to construct the marketing campaign. The results following the marketing campaign completion represent the returns on a subset of that database, but are often too ponderous for any marketing manager to fully digest and infer reasonable decisions for a follow-on campaign, with the exception of obvious user trends that can be derived through traditional data reporting and by a knowledge worker. The long time delay in returning results and the difficulty of using the complex return data to make further marketing decisions has always prevented marketing from advancing from its present state of uncertainty and slow adaptation. This has been a fundamental limitation in advertising and promotion on all communication channels, including radio, television, print media, mail and the Internet. In addition, most criteria for selection of targets for marketing campaigns or individualized promotions are based on traditional selection methods and do not utilize the wealth of data available in detailed transactions (purchases) and web site browsing behavior of customers. This extremely informative source of data is typically ignored, or aggregated to much higher levels, losing much of the valuable details.

More problematic is the impossibility of reliably inferring optimum marketing decisions from the results obtained from marketing or advertising campaigns. Such decisions are typically the result of educated guessing based upon the instincts and experience of the marketing manager and are only partially affected by the actual result data or surveys from previous marketing campaigns. Thus, large marketing resources must be allocated and consumed based upon decisions reached without a meaningful assessment of the reliability of such decisions. Consequently, most marketing resources are wasted because they are directed to large population segments only a fraction of which would have a potential interest in the product or products being promoted. For example, most advertisements on web sites have a click-through rate of only 1.0%. It is also worth noting that this click through is what gets an advertiser to buy advertising space on that site again.

While marketing companies have managed to amass a large database of buyers, buyer behavior and advertising campaign results, the database is not used in marketing decision-making except as background. It is mainly used to blindly construct mailing lists for direct mail advertising rather than to support decision-making. The selection of advertisements or any other marketing campaign such as direct mail and promotions, running on a particular radio or television station, magazine or a web site are made without direct correlation to the users watching or accessing such sites, magazines or stations. Instead, potential advertisers look to the program content of the station or site or magazine and try to deduce from that whether persons interested in a particular product would view or subscribe to the particular site, magazine or television program. Thus, advertising on a web site, for example, is the same for all viewers of the site and is not otherwise adaptable. This lack of adaptability necessarily entails a waste of a large proportion of marketing or advertising resources.

Another factor as to why targeting is becoming an important requirement on the Internet is that customers of Internet sites such as advertisers are starting to pay for results and not just for simple exposure. So an advertiser might pay an additional charge if the user reacts to an advertisement. Reaction may include either clicking on a link (click-through) or buying a product (in which case the advertising site is paid a small share of the price).

For these and other reasons, there is a need for the present invention.

SUMMARY OF THE INVENTION

The present invention relates to data mining for managing marketing resources. In one embodiment, a method for managing a marketing campaign includes the following. First, the method provides a data mining engine capable of being trained with training data and capable thereof of performing inference relative to the training data and on future data. Next, the method provides a user database defining observed characteristics of each one of a set of users. The characteristics include at least one of one or more user's attributes, and one or more of the user's preferences. Finally, the data mining engine is trained with a set of training data comprising the user data base, and a predetermined characteristic pertaining to the market campaign is input to the engine, such that, in response to the input, a subset of the users in the database is obtained that have the highest correlation to the characteristic.

Embodiments of the invention provide for advantages not found in the prior art. In particular, at least some embodiments of the invention are useful for solving problems such as: (1) given a particular product or service to be marketed, identifying the likeliest users to show an interest; (2) given a particular user (who logs on to a web site, for example), inferring the optimum allocation of marketing resources directed toward this user (e.g., a selection of available advertisements) that would result in a sale, a "click-through", or an enhanced navigational experience for the user (especially in stores that carry a large number of products); and (3) given marketing response data to an advertising or promotion campaign, determining the set of customers to be targeted in the next cycle based on response rates and other attributes of customers. Additional applications include inferring unknown data about new users, and data cleaning to fill-in missing data or detect likely incorrect attribute values in a web data warehouse.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 5 is a table correlating segments, advertisement features and success probability (click-through percentage) employed in carrying out an embodiment of the invention.

FIG. 6 is a table correlating clusters, product type and success probability employed in carrying out an embodiment of the invention.

FIG. 7 is a table correlating segments, shopping experience features and success probability employed in carrying out an embodiment of the invention.

FIG. 8 is a table correlating segments, catalog features and success probability employed in carrying out an embodiment of the invention.

FIG. 9 is a table correlating segments, storefront features and success probability employed in carrying out an embodiment of the invention.

FIG. 13 is a diagram illustrating data representing soft segmentation in accordance with one aspect of one embodiment of the invention.

DETAILED DESCRIPTION OF THE INVENTION

Figure 1:
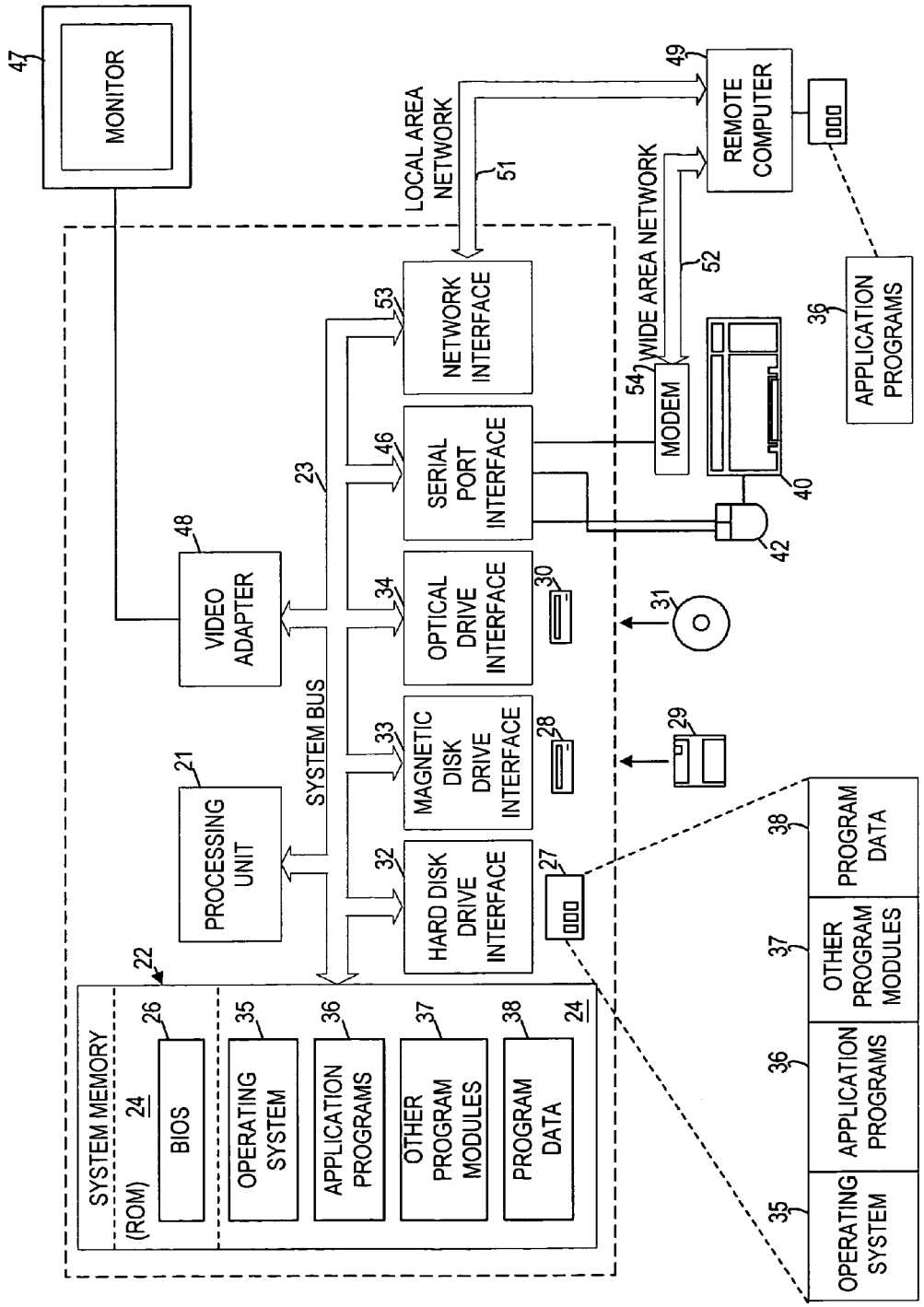
FIG. 1 is a block diagram of an operating environment in conjunction with which embodiments of the invention can be practiced.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps or acts leading to a desired result. The steps or acts are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in the detailed description, methods in accordance with varying embodiments of the invention are presented. The methods can be computer-implemented, and are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in the next section of the detailed description.

Operating Environment

FIG. 1 and the following discussion provide a description of a computing environment in conjunction with which embodiments of the invention may be practiced. Although not required, embodiments of the invention will be described in the general context of computer-executable instructions, such as program modules, being executed by a personal computer. Generally, program modules include processes, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic process that helps to transfer information between elements within the personal computer, such as during start-up, is stored in ROM 24. The personal computer further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage or computer readable instructions, data structures, program modules and other data for the personal computer. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and Internet.

When used in a LAN networking environment, the personal computer is connected to the local network 51 through a network interface or adapter 53. When used in a WAN networking environment, the personal computer typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer, or portions thereof, may be stored in the remote memory storage device. It will be appreciated that the network connections shown are exemplary and other means of establishing a communications link between the computer may be used.

Overview and Problems Addressed

In this section of the detailed description, an overview of embodiments of the invention is presented, as well as problems addressed by at least some embodiments of the invention. Some embodiments of the invention are useful in managing marketing resources in a number of environments, while other embodiments are useful in enabling an Internet site to implement marketing campaigns on the Internet. One embodiment of the present invention integrates the various components involved in setting up an advertising or promotions policy, executing the campaign, tracking the responses, and utilizing data mining to help a store manager better understand the performance and revise the advertising/promotions scheme.

Furthermore, using usage data captured by a data warehouse, one embodiment includes capabilities to enhance the data about the general population of shoppers by utilizing detailed data about a subset of shoppers on which "high-resolution data" (detailed marketing information) is available. Given a sample data set that contains high-resolution (detailed) data points about users, one embodiment of the invention identifies attributes of the users, defines population segments, and correlates the attributes of the sample segments with known attributes of a larger user population to identify additional properties (attribute values for unmeasured attributes) of members of the segment with a high degree of certainty. This enables on-line sites to automatically "fill-in" missing information about their users (e.g. likely age range, sex, affinities, etc.) The data mining components to be used can span a wide range of data mining techniques.

In one embodiment, a decision-tree based approach will be used to predict specific attribute values, while a scalable clustering approach will be used to form segments based on usage and purchase behavior data. Such data mining components are becoming available as off-the-shelf products: for example part of Microsoft Commerce Server and Microsoft SQL Server products.

Next, problems addressed by at least some embodiments of the invention are described. As those of ordinary skill within the art can appreciate, however, the invention itself is not limited to only providing solutions to these problems. Rather, the problems described herein are presented for better understanding of specific embodiments of the invention.

With respect to direct marketing, the tasks of tracking a direct mailing, analyzing response data, and building models to set the next phase of the campaign take months and are usually handled by third-party vendors who specialize in this data processing. An integrated system is provided in one embodiment that automates much of this work and makes it convenient to do as part of the set of tools available with a commerce server product.

One embodiment provides a rich feature set by providing marketers with a fully integrated, easy-to-use marketing system that is capable of segmenting users using certain attributes and then identifying users with similar attributes. The correlated user information can then be used to implement marketing campaigns designed to acquire and retain specifically targeted customers. The goal is to provide an integrated environment to enable:

- The ability to actively target promotions, either through direct mail, e-mail, or channel push methods, based on accurate statistical modeling methods.
- The ability to monitor the performance of promotions and to feed the acquired feedback information back into the customer model.
- Campaign management on the web, spanning the spectrum from targeted ads to tracking responses, segmenting users, and planning of subsequent campaigns
- Provide the basic information needed to enable a store to establish as close to a 1-1 marketing relationship with its customers as possible, including basic information needed to customize the catalog content presentation. This can be extended to more sophisticated customizations including store appearance, layout, and pricing on a per customer segment basis.
- Provide data mining tools needed to model, visualize, and attach segment labels to customers based on information obtained from various sources including: purchase history, browsing behavior, responses to ads/promotions, and information obtained from personalization and market surveys. An additional capability that we provide is the ability to "fill-in" missing or unknown information about some customers, based on more detailed information available about other customers. Hence browsing and purchasing behavior may be predictive of sex, age, buying affinities, and other similar attributes.

Data about users on the Internet today is derived from several sources including the following:

- User-entered data. Information entered by the user such as surveys, order forms and registration forms. The accuracy of user-entered information depends on the user's motivation in the specific instance. For example, a user may not be motivated to enter accurate personal information such as gender or age when registering in a free site unless there is an obvious purpose and use to this information. On the other hand, a user is highly motivated to enter accurate address information when purchasing an item over the Internet.
- Server-derived data. Information collected by the Web server, which usually requires minimal analysis in order to derive information about the user. This information can be obtained using server analysis tools such as the Analysis feature of Microsoft Site Server. For example, the IP address of the user can be obtained from the Web server, and from that address, a reverse DNS lookup can be used to obtain the user's domain name (.org, .edu, .com, etc.). Similarly, the set of URLs that a user visits can reveal that user's interest, while the time of day may be used to imply whether the user is browsing from home or from the office.
- Business relationship data. Data obtained from business operations and 1-1 interactions with customers, such as customer support, technical support, questions, phone surveys, etc.
- External data. Information obtained from outside sources, such as purchased mailing lists. Such demographic and psychographic data is "overlaid" on existing customer data and matched either by zip code (for neighborhood based data) or by address (for household data). While this data is available on hundreds of millions of individuals, often it is difficult to match a customer to an entry in such databases.

Usage Scenario: An Example

In this section of the detailed description, a specific example is presented to aid in understanding embodiments of the invention. In this illustrative example, the software implementation of this embodiment of the invention is referred to as Marketing Management System (M2S). The invention is not limited to this example; rather, the example is merely illustrative of a few features of this invention and how they are used by a marketing person.

Zeena Arbor is a marketing manager at a large corporation. She has been tasked with the important job of running the direct marketing campaign for a new product called the XPS1000, a new home PC running a powerful microprocessor chip with an integrated home theatre system. Sales of XPS1000 have been disappointing, as only 300 systems have been sold since introduction of the product 4 months ago. This is much lower than original projections. Her employer has a customer database of 2 million shoppers. Zeena had access to 10,000 color brochures explaining the features of XPS1000 ($6 per mailing) and an additional 5000 demo CD-ROMs ($10 per mailing). Clearly she needs to be selective in sending the promotional material.

Being a Microsoft Site Server Commerce user, she knew she could e-mail all customers using the direct mailer. However, realizing the cost of bothering customers with unwanted mail, she decided to target the initial stage, using an embodiment of the present invention, which will be referred to in this tutorial example as the marketing management system. Zeena's first approach was to pull the list of customers that bought the new XPS1000. Of these, 200 had upgraded from a previous system sold by her employer. She then queried the mining component of the marketing management system to rank the list of her employer's customers by similarity to the list of 200 upgrades. Using the user segmentation system of the marketing management system, this was an easy task as users have been segmented based on browsing behavior and purchase history. Users from segments that the 200 upgrades belong to where retrieved resulting in a list of 35,000 likely upgrades.

Zeena e-mailed the 35,000 prospects pointing each to a unique URL to order more information. She activated the campaign management component of the marketing management system and requested auto-tracking of responses. 2000 requests for more information came in, and over the next week she obtained reports on browsing activity driven by her original mailing. Within 2 weeks, 100 of the 35,000 prospects had ordered a XPS1000. Zeena now used the Predictor component of the marketing management system to further mine the list of 35,000 prospects and requested that this list be ranked by similarity to the 100 customers who ordered the new system. She selected the top 3000 customers in the match list returned by the invention and mailed them color brochures. She included 500 CD-ROMs with the packages sent to the top 500 customers in the matched list.

Within a week, an additional 300 orders came in from the set of people to whom a brochure was mailed, and 50 of those orders came from prospects who were mailed the CD-ROMs. Building on this initial success, Zeena got authorization to set up a special advertising program on her employer's web site to target browsers who are likely to be XPS1000 purchasers based on their browsing behavior. Zeena made use of an adaptive ad rotation capability of the marketing management system to put this campaign in place. First, she used the segmentation component to analyze browsing behavior of XPS1000 purchasers. Using the segmentation browser, she quickly pinpointed segments of interest and she designated special actions to be associated with members of the segments of interest:

1. high-interest segment: put up a GIF ad that offers a free CD-ROM
2. high-interest, lower budget segment: put up a GIF ad that offers brochure and $75 off coupon
3. likely-interest segment: GIF to redirect to XPS1000 page
4. medium interest, casual home users: special GIF ad to point out leisure uses of
5. other: do not take action The marketing management system, being integrated with Microsoft Site Server Commerce made it possible to do all of the above with less than 2 hours of effort.

Next week, 500 orders came in for XPS1000's, 400 of which came via Zeena's special ads, majority coming from segments 1 and 2 above.

Zeena was promoted to marketing manager, and put in charge of marketing high-performance PC's to a target database of 10M prospects on which her employer had ordered demographic information. This time, she had 1M marketing CD-ROMs. Her first challenge was to decide who in the list of 10M customers is likely to have a CD Drive to begin with. She remembered that the marketing management system has a predictive capability to fill in a new column if some partial information is provided. Cross correlating the 10M listing with her employer's customers, she found an overlap of 50,000 customers, 40,000 of which had CD-ROM Drives. Zeena knew that using prediction components of the marketing management system, it will be easy for her to predict who had CD ROM Drives. The benefits realize were:

1. avoided inundating customers who are not likely interested
2. Maximized return and reduced costs on advertising resources (sending XPS1000 CD ROMs) and avoiding sending CD ROMs to people who do not have a CD ROM drive.
3. Drove sales of XPS1000's and PC's
4. Used the web to do most of the marketing, cutting costs and enhancing usability of the site by the customers.
5. Was able to provide readable reports on customer segments and marketing campaign effectiveness.

Operation & Usage

In this section of the detailed description, an overview of the operation of one embodiment of the invention is described, as well as the usage to which one or more embodiments of the invention can be put. The overview of the operation is as follows.

A preliminary aspect is to acquire a set of data that is known to be accurate with a high level of confidence. This sample data can consist of a combination of user-entered, server-derived, and external data, including information collected from the browser usage logs, shopping sessions, user-entered forms such as surveys, and external high-resolution data points stored in legacy systems or purchased from external information agencies such as postal data, credit card information and driver license information.

The sample customer list is fed into the Profiler of one embodiment, which uses the data to build a user model. This user model describes the various segments that constitute the user population. Each model also contains attributes that describe the segment. These attributes are ranked according to their applicability to the segment. Segmentation is derived using clustering techniques such as K-means and EM algorithms for mixture modeling, applied to the collected data. Cluster visualization techniques are then applied to derive meaningful labels (segment identifiers) to each segment and to a hierarchy imposed on these segments (groups of clusters). At the top level of the hierarchy is the group (segment) containing all customers. The leaves are the segments derived via clustering. Each cluster is described by the attribute values that distinguish it from the overall population of customers as well as characteristics that distinguish it from other similar clusters. For example, a cluster may be "young-adult, male customers, who are primarily interested in new products and do not invest much time in browsing the store". This information can be derived from known attributes as well as browsing behavior and purchase history.

An example of applying the clustering algorithms on the MS-Advantage site shopping information yielded a segmentation consisting of 5 segments. An example showing a tool for visualizing and labeling these clusters is given below in this specification, along with details of this cluster visualization and labeling scenario.

The next part is to compare the profiles against a potential user population about which less is known. For example, only the URLs visited or items purchased may be known about a new visitor. One embodiment of the invention correlates the known user segment profiles against the available attributes of the users about which less is known, and assigns segment names to each user. A probability rating is assigned to indicate the statistical likelihood that the given user belongs to the known segment. Although a user can belong to more than one segment, the user can be assigned to the segment to which the user belongs most strongly. There are two modes of segmentation available.

1. Hard segmentation: if the marketing manager requires each shopper to be placed in exactly one cluster (segment).
2. Soft segmentation: if the marketing manager prefers to have probabilistic membership information, allowing a shopper to fit into multiple segments but with differing probabilities. These probabilities can also be useful in biasing the behavior of the Ad Server component and its policy for serving ads.

The obtained clusters (segments) are put through the segment visualization and labeling tool in order to determine a marketing-related "label" to tag the segment with (e.g. label "high-profit" can be used to tag the cluster representing "middle-aged individuals, who bought our higher-end models, and who buy frequently". These segment names are then written as attributes of each user to the user OLTP data store or personalization system, such as the Personalization feature of Microsoft Site Server. In addition, the sample data can be updated to include additional user attributes generated by the Profiler component of one embodiment of the invention.

The derived attributes can continue to be refined by feeding additional user data, both explicit and system-derived, and repeating the above.

The marketing manager or system user uses an embodiment of the invention to produce highly-qualified targeted user lists which can then be used to generated direct mail, personalized catalog content presentation, and other targeted promotions.

Results of the promotions can then be tracked by one embodiment, tabulated, and fed back into the system to further enhance the accuracy of the profiles.

Information obtained from embodiments of the invention can be used in many ways. Some of these ways are now described. However, the invention is not limited to the usage presented herein, as can be appreciated by those of ordinary skill within the art.

Marketers can gain insights to the type of user groups that shop at their store. Rich reports and visualization tools provided in an embodiment enable marketers to understand the user demographics of a site/store. This information can be used to implement new marketing campaigns and types of products that might be carried by the store.

Taking control of large and growing data sets. Users of this invention can leverage it to gain insight on the type of users in a data warehouse with a very large number of users and attributes on the users.

Advertising sales forces can acquire additional data on the groups of users that visit their site, in order to better target advertising and sponsorship campaigns. The data can be used to better target ads and increase the likelihood of users interacting with an ad or a promotion. Advertising sales force can also use the additional data about their users to attract advertisers in new categories.

Adaptive Ad rotation: bias the ad serving policy of the Ad Server to maximize the likelihood of a click-thru, a buy-now event, or a x-sell opportunity.

Customized promotion/special offers/special pricing by segment.

Customizable catalog content presentation. The profiling information derived can be used to select among a set of possible "storefronts" to display, or to even decide on the layout of products within a store section. In this system, the store manager, having studied the various segments, decides on a set of "custom store front" to be associated with the segments. The mapping from segments to custom storefronts may be many to one. Based on the segment identifier of a shopper, the proper storefront is selected.

Systems

Figure 2:
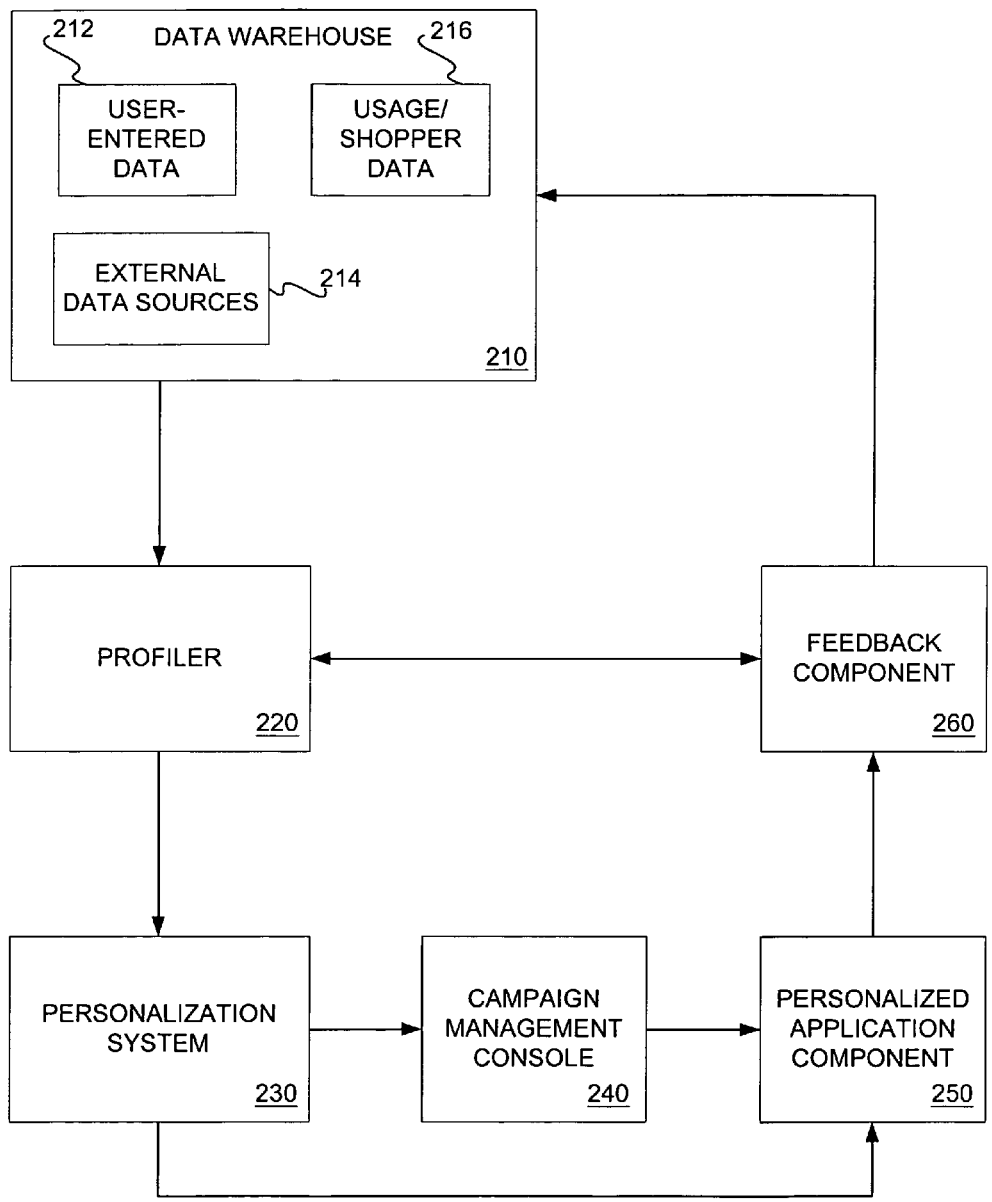
FIG. 2 is a block diagram of a system according to an embodiment of the invention

A description of a system according to one embodiment of the invention is now presented. Referring to FIG. 2, the system of one embodiment includes a data warehouse 210, a profiler 220 which receives data from the warehouse 210, a personalization system 230 which receives results from the profiler 220, a campaign management console 240 and a personalized applications component 250 both of which utilize the output of the profiler 220. The personalized applications component 250 typically includes elements outside of the system, such as a person or web site manager as well as utilities for activating selected advertising, storefront or catalog features of the web site, for example. While this description makes reference to examples involving a web site, it should be understood that the invention is applicable to other media used for marketing, such as radio, television and/or interactive television.

Feedback of live reports from the personalized applications component 250 to the data warehouse is provided by a real-time feedback component 260. The embodiment of FIG. 2 illustrates all of the components, not all of which are necessary to realize utility. For example, a product-oriented marketing campaign would need the campaign management console 240 but not necessarily need the personalized applications component 250. Conversely, selecting products to market or marketing features within a given site or station requires the personalized applications component 250 but not the campaign management console 240. Moreover, certain system elements could be subsumed within other elements and thus eliminated as independent entities. For example, certain functions of the personalization system 230 could be performed by the profiler 220. Also, some system elements depicted in FIG. 2 may not necessarily be included within the marketing management system of the invention but may instead be provided within other software, firmware or hardware components already existing in the host computer. Specifically, for example, the personalization system 230 may be the Personalization feature of Microsoft Site Server, Commerce Edition 1.0. However, in the following description of FIG. 2, each of the elements depicted therein will be referred to as an element of the "system" for the sake of simplicity.

The data warehouse 210 stores data containing attributes and/or preferences of many users. Data is stored in the data warehouse for the intended purpose of analysis (reporting, etc.). The data warehouse may include a user-entered data memory 212 storing information voluntarily entered by users. Such data is acquired via the mail by information entered on warranty registration forms for example or on a web site by users who voluntarily respond to information inquiries made by the site, for example. In addition, there are a number of large user data bases accumulated over many years by various marketing organizations, which data bases will be referred to herein as "legacy" data bases. Such extensive legacy data bases may be acquired through commercial external data sources and stored in the data warehouse 210 in external data source memory 214. As will be discussed below, the integration of such legacy data is a significant advantage of some embodiments of the invention.

User data may also be developed by the system itself as user behavior, e.g., choices and purchases, are observed, as will be discussed herein below. This data is particularly easy to develop on a commercial web site visited by shoppers, as but one example. Such data is accumulated and stored in a usage/shopper data memory 216. Other types of data sources not disclosed specifically herein may contribute to the data warehouse 210 of FIG. 2. Such data correlates at least two of the following vectors: user identity, user attributes and user preferences. The best data will correlate a complete set of user attributes and user preferences for each identified user. However, some of the user data may be incomplete, as it may be missing, for a given set of users, certain attributes, all attributes, certain preferences or all preferences. As will be discussed below, the system readily exploits such incomplete data. Incomplete data may reside within any of the data warehouse memories 212, 214, 216.

The profiler 220 includes a probabilistic or statistical model as an inference engine. This model may be one of many well-known types, such as, for example, a Bayesian network, although the present invention is not restricted to any particular type of statistical model. In one embodiment, the statistical model of the profiler 220 is constructed using user data from the data warehouse 210 as the training data, using conventional techniques well-known in the art. The statistical model of the profiler 220 is employed to perform conventional functions on the data, such as classification of individual users in the database, clustering of the database and correlation of new or unknown users to the clusters. The profiler 220 provides cluster visualization tools disclosed below herein which facilitate the labeling of individual clusters of user data and the identification of their preferences. Such knowledge is used, for example, in personalizing a web site to a particular user or member of a particular cluster by the personalized applications component 250. The generation of such information employs conventional statistical methods.

Since the profiler 220 has all of the capabilities of a statistical model such as a Bayesian network for example, it can quickly process any extremely large user database stored in the data warehouse 210 to determine hitherto unknown clusters of users distinguished by different states of an unknown or hidden variable, such as a user attribute not explicitly tabulated in the user database. As will be described below herein in greater detail, the hidden variable (e.g., user preference or attribute) differentiating the different clusters may be inferred by the system administrator or site manager using the cluster visualization tools provided by the profiler 220.

The personalization system 230 takes the results generated by the profiler 220 and tags the user data in the data warehouse 210. The personalization system can interact with the cluster visualization tools provided by the profiler 220 and track the shopper attributes assigned to new clusters or new users and tabulate these with the corresponding users and clusters from the database. Such a tabulation is employed in the campaign management console 240 and the personalized application component 250. The personalization system 230 may be the Personalization feature of Microsoft Site Server, Commerce Edition 4.0.

The campaign manager 240 is a tool which provides the administrator an interface with which he can view classification or clustering results and correlate these with the goals of a specific or on-going marketing campaign. Principally, the campaign management console 240 facilitates correlation of the classification or clustering results from the profiler 230 to a particular product to be marketed or to selected user attributes identified with that product. The result is the sorting of a group of users by the likelihood of their being interested in the product. This enables the campaign manager to focus his marketing resources (direct mail, coupons, etc.) on a smaller more likely group of prospects.

The campaign management console 240 also tracks campaign results for evaluation and use in refining or revising the campaign. If the campaign is conducted on the Internet for example, user response (e.g., ad click-throughs) may be tracked in real time by the campaign management console 240 and stored in the data warehouse 210. Using such results, the campaign management console 240 calls on statistical tools in the profiler 230 to process the results to predict the probable success or failure of proposed changes to the marketing campaign. Such changes may include changes to the list of users to be targeted. Additionally or alternatively, such changes may include changes in the advertising strategy or ad content. For example, the marketing manager may need to know whether to pitch the product with a more masculine or feminine approach in the ads, or whether that particular attribute (sex) makes any difference at all.

The campaign management console 240 may make use of historic campaign data recording the relative success of prior campaign cycles with different marketing/advertising features or ad types and/or targeting different user clusters with different attributes. Using such data, the campaign management console 240 calls on the statistical tools or results from the profiler 230 to make predictions involving changes in the vectors tabulated in the historic campaign data (e.g., changes in the advertising features and/or changes in the targeted user attributes or clusters). Using such predictions, the marketing manager can then make informed reasonable decisions to adopt or reject such changes to improve his campaign.

One use of the campaign management console 240 is to cull out of the campaign result data those targeted users who actually made a purchase, and form a new database of actual purchasers. The most prevalent user attributes of the new database are then "learned" by the campaign management console 240 using the statistical tools of the profiler 230. The most prevalent user attributes of the database of actual purchasers are then employed to cull out likely purchasers from the general user data base, thus forming a proposed set of users to be targeted in the next campaign cycle. As a result, the general user database is more completely exploited for likely prospects than would otherwise be possible, a significant advantage. This application will be discussed in greater detail below in this specification.

The personalized application component 250 adapts a particular web site or other adaptive medium (e.g., a web-TV station) to a particular user when that user begins viewing the station or logs on to the web site. In particular, the personalized application component 250 adapts commercial features of the site (e.g., advertisement selections, store front features, catalog content, shopping experience or direct mail content or targeting. The adaptation of these types of features is performed in accordance with the statistical results obtained by the profiler 230 so as to maximize the probability of the user making a purchase or a click-through.

The personalized applications component 250 includes elements external to the data mining system. For example, in managing a web site, the personalized applications component must access and manipulate different advertising features of the web site. For this purpose, the personalized applications component uses or includes conventional web site management tools controlling web site configuration. Specifically, those web site management tool controlling the selection and presentation of advertisements are called by or are included in the personalized applications component 250. The personalized applications component 250 must correlate each of the adaptable site features to different user attributes and/or preferences in order to employ the statistical tools of the profiler 230 in selecting or adapting site features to a particular user. Such a correlation may be initially created by the site manager. In one embodiment, the correlation is made based upon actual user responses to the different site features, so that user attributes and preferences are correlated by data to success rate (click-through rate) of each site feature. Such data becomes available as the site is visited over time by a large number of users. It is captured under control of the personalized applications component 250 and fed back to the data warehouse 210 through the feedback/live report component 260.

The personalized application component 250 uses the statistical tools of the profiler 220 to match the selectable features of ads, catalogs, store fronts, shopping experience or direct mailing (e.g., via the Internet) to the attributes of the user who has logged on to the site or station or who is the direct mailing target. The match is carried out using the statistical modeling tools of the profiler 230 so as to maximize the probability of the user making a purchase. For example, a basic choice is the products to be presented to the user. Based upon the history of all users in the database, the set of attributes of the current user in question can be used to classify that user (whether or not he is a member of the database)

and determine the likeliest products he would purchase. The user's attributes may not become apparent until he has made a series of choices in navigating the web site, for example. However, as he establishes a tree of choices in the site, these selections may be matched statistically to users in the database who have made those same choices, and their attributes are then imputed to the current user. Such a capability enables a web site (within several mouse clicks) to determine the segment and general interest of a new visitor. Subsequently, the site can then be personalized to this new user, giving the site a significant advantage over other traditional sites.

The feedback component 260 captures user responses to marketing campaigns of the management console 240 or personalized advertising or the like of the personalized applications component 250 and causes the response data to be processed by the profiler 220. The profiler 220 returns updated assessments of user profiles, including user attributes and user preferences. The improved assessments are fed back to the data warehouse 210 to update or replace less complete or less reliable data on a particular user. This feature enables the real-time assessment of the attributes of a new user on a web site by observing his succession of site menu choices, as described above. The role of the profiler 220 in assessing the latest usage data is to correlate the choices of the new user with the known attributes of users in the database who have made the same or similar menu choices or who have behaved similarly. Such a correlation is readily performed by the statistical model embodied in the profiler 220.

The improved assessments thus generated enable a data cleaning operation in which prior erroneous assessments of the user previously stored in the data warehouse 210 are replaced by the latest assessments based upon current behavior of the user. Moreover, as the user's attributes become more apparent, the profiler 220 associates him or her with a known cluster of users, the complete attributes of which have been previously defined by the statistical model. Thus, the same complete set of attributes are assigned to the current user. As a result, any unknown attributes of the current user are filled in by this assignment.

In one embodiment of the invention, a cluster visualization tool is provided. The invention is not particularly limited to a given type of such a tool, however. The visualization tool facilitates the naming of each segment based upon a comparison of the typical preferences of one segment with that of another and with that of all other users. A description of one such visualization tool is found in the coassigned and copending U.S. patent application Ser. No. 09/104,751, filed on Jun. 25, 1998.

Methods

In this section of the detailed description, methods according to varying embodiments of the invention are described. The methods are described as being performed by various components of the system described in the previous section of the detailed description. However, the invention itself is not so limited. That is, methods according to embodiments of the invention can be performed not necessarily in conjunction with the system described in the previous section.

Figure 3:
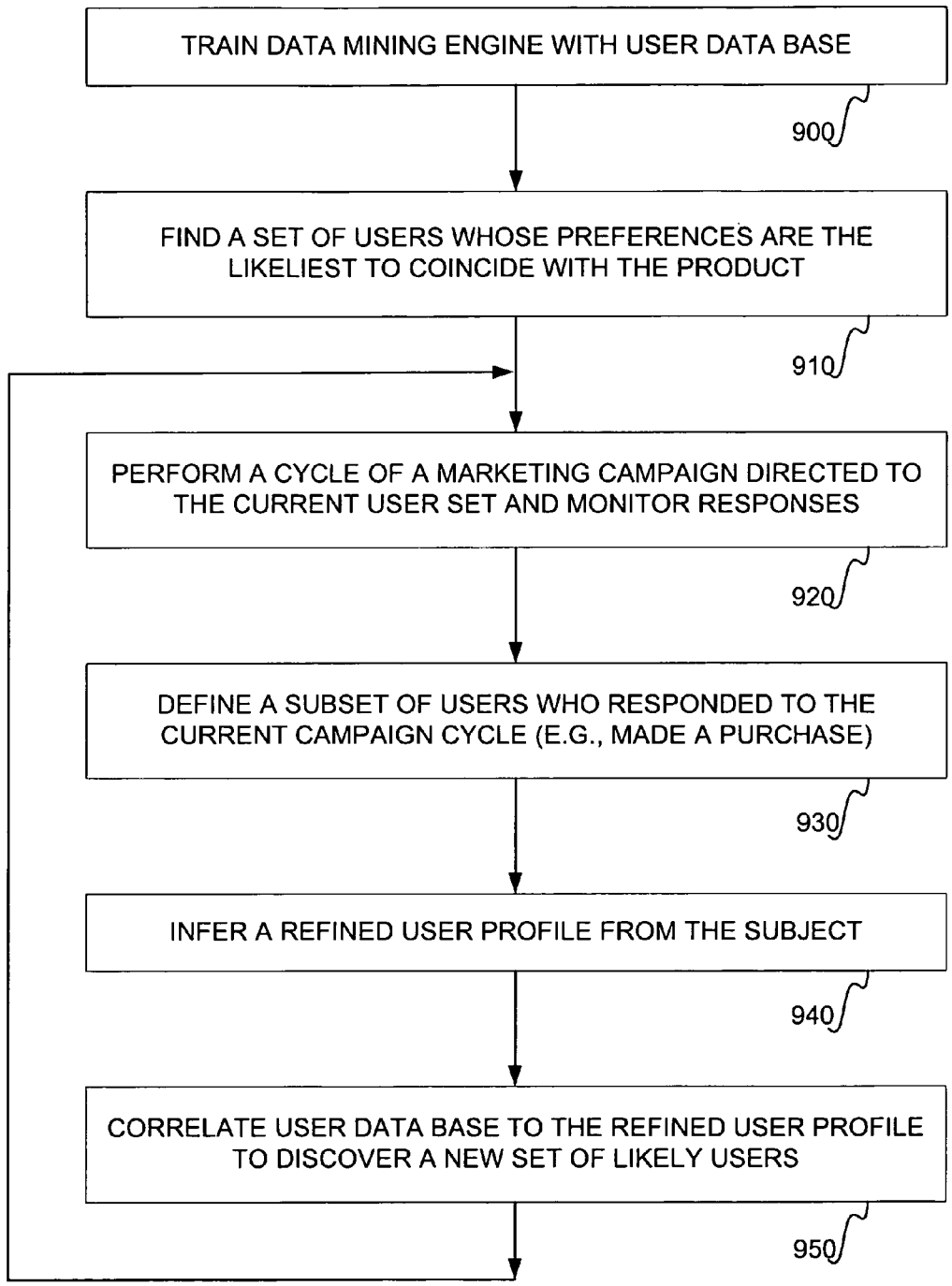
FIG. 3 is a flowchart of a method for managing marketing resources in a marketing campaign according to an embodiment of the invention.

FIG. 3 illustrates how the campaign management console 240 optimizes a marketing campaign directed to a particular product or service for maximum response. The first part is to train the data mining engine or statistical model of the profiler 220 using the user database in the data warehouse 210 as the training data (block 900 of FIG. 3), using techniques known in the art. Once the model is constructed, it is used to define a set of users who are the most likely to prefer the product being marketed (block 910 of FIG. 3). In order to find such a set of users, the data mining engine may either search the training data base or may search a new database. If the training database is searched, then the identification of likely purchasers is accomplished by classifying individual users by the likelihood of their interest in the product, or by dividing the users into clusters, one of which contains the users most likely to make a purchase. If another database is searched, then users with those attributes most similar to the training database cluster of greatest interest in the product are chosen by the data mining engine. In either case, the training data is used to infer a set of user attributes characterizing typical purchasers. The clustering operation accomplishes this.

Next, a marketing campaign cycle directed toward the identified set of users is performed (block 920 of FIG. 3). The features of the marketing campaign may be statistically optimized based upon the attributes and preferences of the targeted group using the personalization application 250 already described. This operation is described below with reference to optimizing a single web site or media station, but its application to tailoring a marketing campaign is the same type of operation, the difference being that the marketing campaign is tailored to the attributes of a targeted group of users rather than to the attributes of a single user.

The marketing campaign results tracked by the feedback component 260 are culled for the targeted users who were actually persuaded to make a purchase, to form a subset of actual purchasers (block 930 of FIG. 3). The user attributes of this subset are then statistically evaluated by the data mining engine of the profiler 220 to infer a more refined user profile (block 940 of FIG. 3) or likeliest user attributes. Next, any data base (including, for example, the training data base stored in the data warehouse 210) may be statistically evaluated against these likeliest user attributes to discover other highly likely purchasers not previously identified (block 950 of FIG. 3). The process then reverts to block 920 to perform the next marketing campaign cycle.

Figure 4:
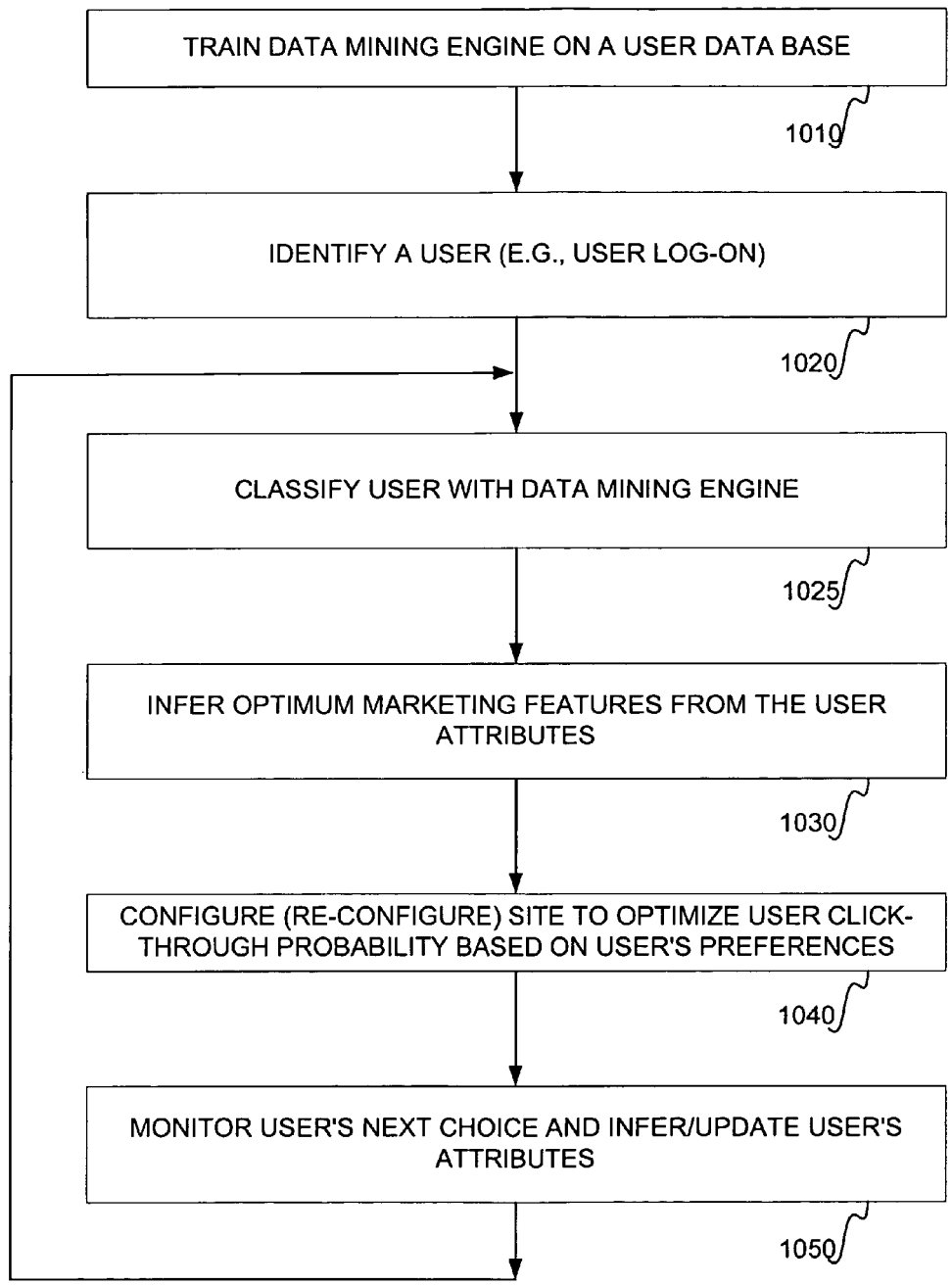
FIG. 4 is a flowchart of a method for personalizing marketing features to a particular user according to an embodiment of the invention.

FIG. 4 illustrates how the personalized application component 250 adapts marketing features (e.g., advertising content, catalog content or appearance, and so forth) to the attributes of a particular user. The set of attributes to which the marketing features are adapted or personalized may be those of an individual user who, for example, has just logged onto a web site. Alternatively, they may be the set of attributes of a large set of users who have been targeted for a marketing campaign in support of the marketing campaign management process of FIG. 3 described above.

In the personalization process of FIG. 4, the first part (block 1010 of FIG. 4) is to train the data mining engine of the profiler 220 using the user data base in the data warehouse 210 as the training data (unless this has been performed already by the process of FIG. 3). The next part is to identify the user (or a set of users) of known attributes (block 1020 of FIG. 4). The user attributes are statistically evaluated by the data mining engine to classify the user or set of targeted users (block 1025) and thereby infer his (or their) most prevalent attributes and/or preferences (block 1030 of FIG. 4).

Next, in block 1030, the data mining engine of the profiler 220 is used to infer the optimum marketing features from the set of attributes identified in the previous block. In order to accomplish this, the success rate of each marketing feature taken from its history of actual use in the data base is tabulated across the set of all (or at least many) user attributes from the set of user data stored in the data warehouse 210. This tabulation is readily accomplished by the profiler 220, and is described in greater detail below.

In response to the results of block 1030, the marketing features are chosen or the site is adapted to optimize its performance with the identified set of user attributes (block 1040 of FIG. 4). The resulting user response is monitored by the feedback component 260 (block 1050 of FIG. 4) to improve assessments made by the data mining engine and correct or refine corresponding data entries in the data warehouse 210. The process can then begin the next cycle by returning to block 1025.

Next, the operation of block 1030 is described in more detail, in accordance with one embodiment of the invention. The marketing features inferred in block 1030 may be the set of catalog features which can be chosen individually to construct a catalog. The marketing features may be the set of advertisements which can be chosen individually to present a limited concentrated set of advertisements to the user. The marketing features may be the set of advertisement features which can be chosen individually to construct a particular advertisement. The marketing features may be the set of storefront features which may be chosen individually to construct a storefront to be presented to a particular user (or set of users). The marketing features may be a set of shopping experience features which may be chosen individually to define a shopping experience personalized to a particular user or users. The marketing features may be a set of products from which may be chosen a limited set of products which a particular user or users is most likely to purchase.

FIG. 5 illustrates a tabulation used by the personalization application component 250 in carrying out block 1030. The tabulation of FIG. 5 is of advertisement features by cluster (to identify the user attributes) and by click-through percentage (to identify success rate). FIG. 6 illustrates a similar tabulation of products. FIG. 7 illustrates a similar tabulation of shopping experience features. FIG. 8 illustrates a similar tabulation of catalog features. FIG. 9 illustrates a similar tabulation of store front features. The personalization application component 250, using the data mining engine of the profiler 220, matches the most prevalent attributes of the particular user or users against these tabulations to infer the statistically optimum choices of features quickly and automatically.

Figure 10:
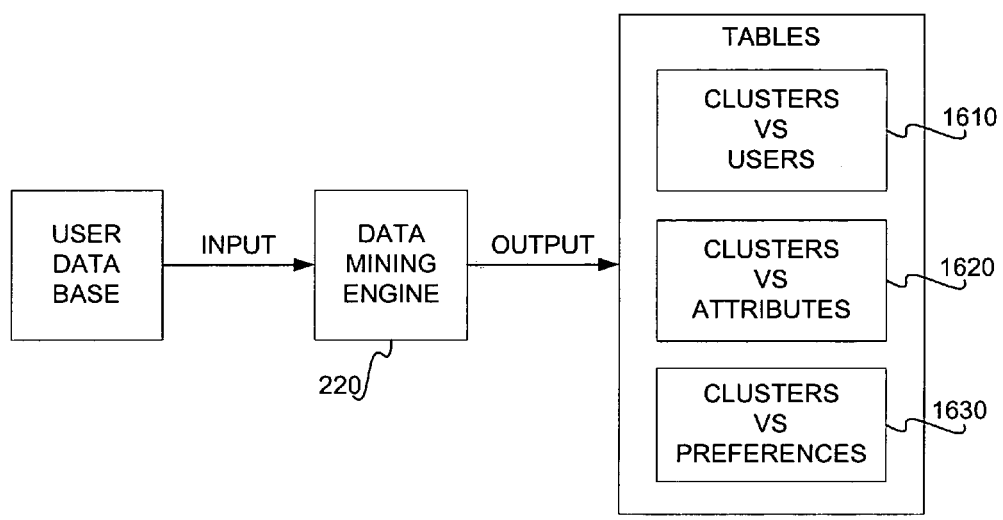
FIG. 10 is a diagram depicting how segmentation results are produced in carrying out an aspect of one embodiment of the invention.

Next, the generation of cluster tables (for example, by the profiler 220) is described in more detail, in accordance with one embodiment of the invention. FIG. 10 illustrates the generation of cluster tables by the profiler 220. The data mining engine of the profiler 220 processes the user data based to produce a table 1610 of clusters versus users, a table 1620 of clusters versus user attributes and a table 1630 of clusters versus preferences.

Figure 11:
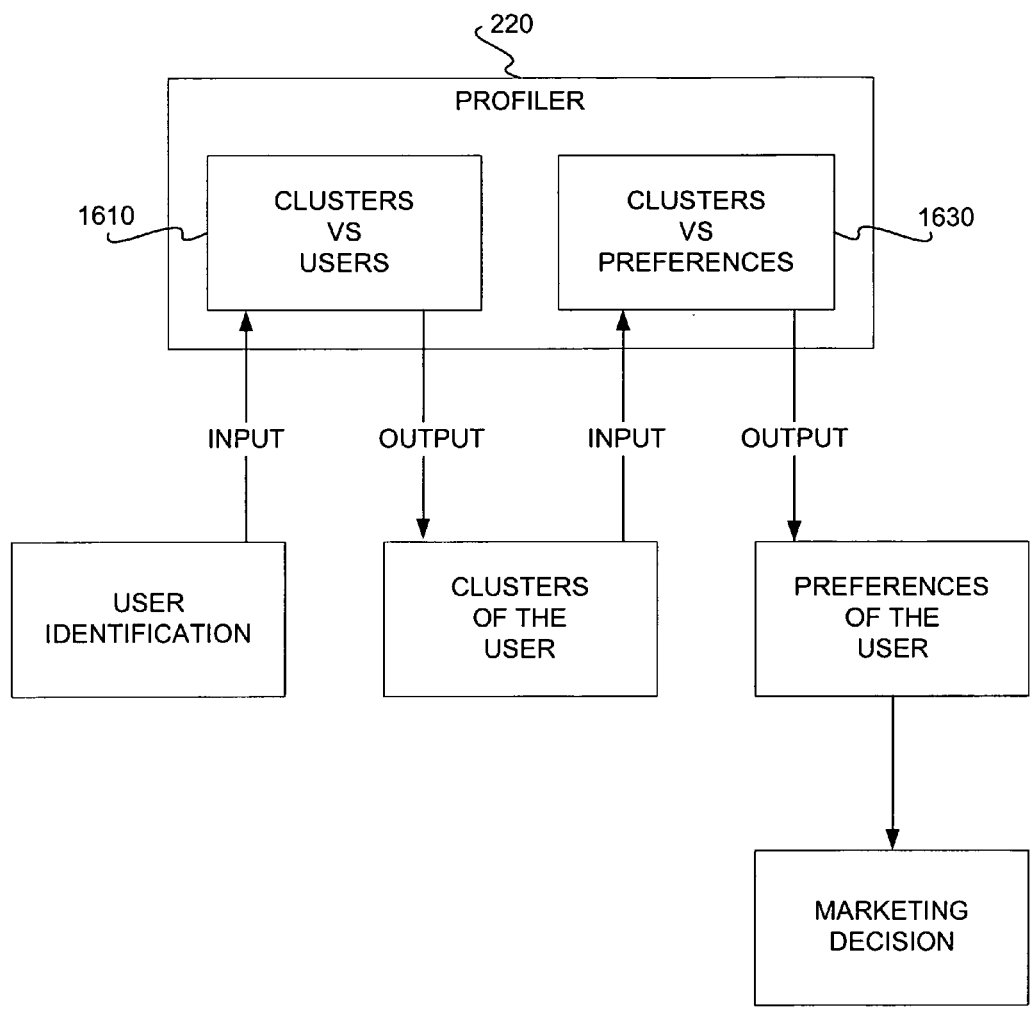
FIG. 11 is a diagram depicting how user characteristics are inferred from segmentation data in carrying out an aspect of one embodiment of the invention.

FIG. 11 illustrates how the profiler deduces the preferences of a particular user using the cluster tables of FIG. 10. The user is identified to the table 1610 of clusters versus users, which then outputs the cluster of that user. This is applied to the table 1630 of clusters versus preferences, which returns the preferences of the particular user. From this, a marketing decision may be made.

Figure 12:
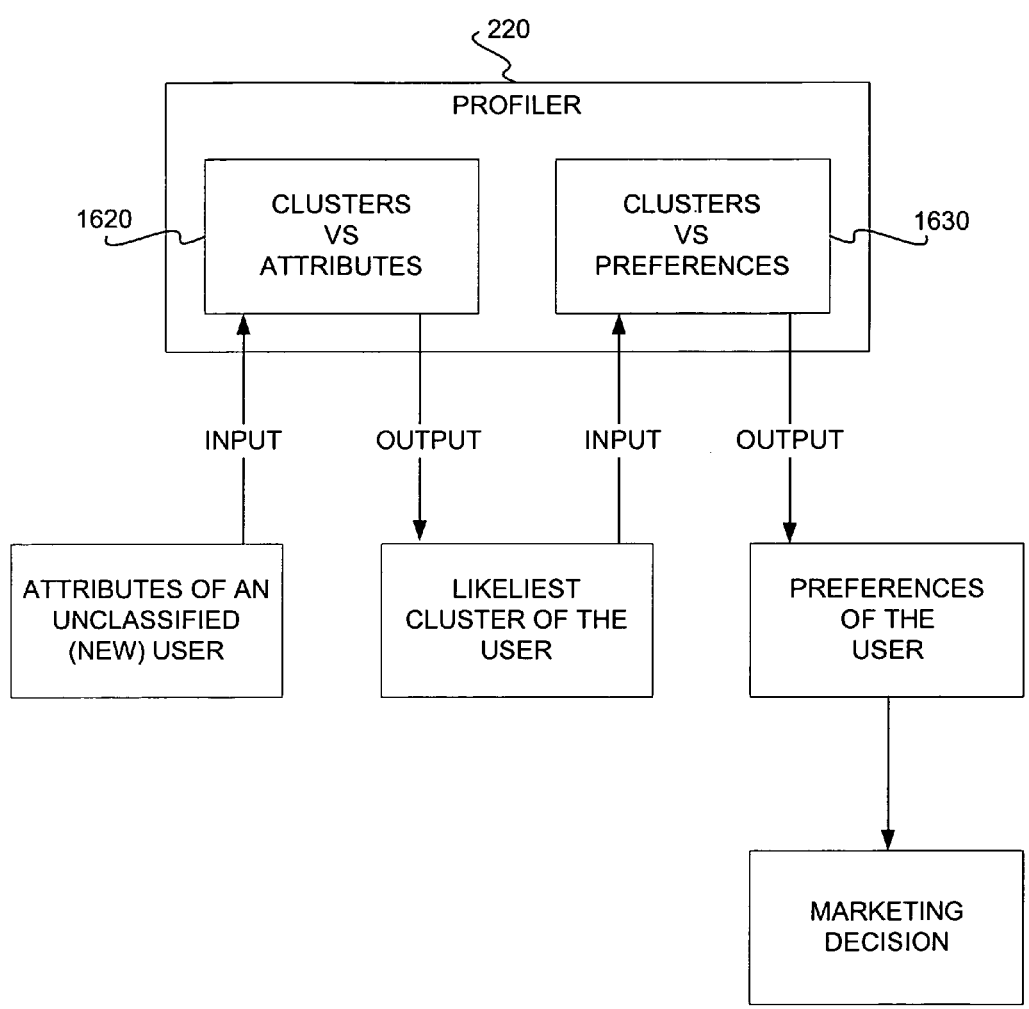
FIG. 12 is a diagram depicting how the characteristics of new users are inferred from segmentation data in carrying out an aspect of one embodiment of the invention.

FIG. 12 illustrates how to infer the preferences of a user whose attributes are known (or become known during a visit to a web site, for example). The user's attributes are applied to the table 1620 of clusters versus attributes, which returns the likeliest cluster of the user. This information is then applied to the table of clusters versus preferences, which returns the preferences of that user. This result is then employed to make a marketing decision. FIG. 13 illustrates the results of soft clustering, in which the user is assigned to several clusters with a probability weighting factor for each cluster determined by the data mining engine.

Figure 14:
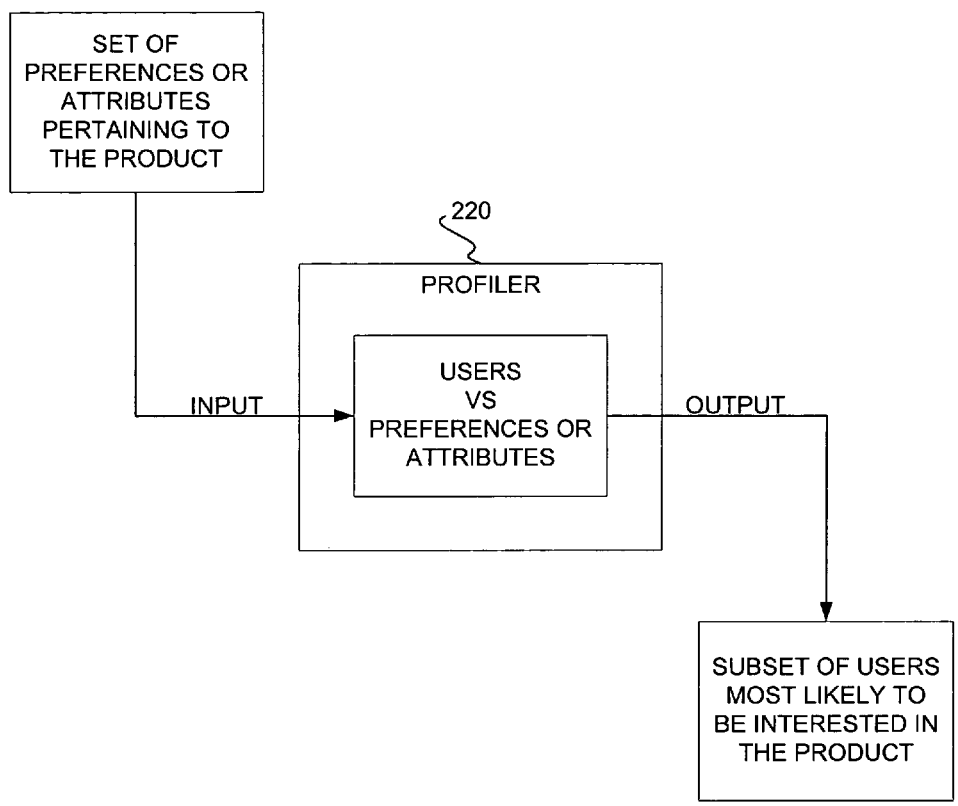
FIG. 14 is a diagram illustrating how characteristics relating to a product are used in one embodiment of the invention to find a set of the most likely purchasers in accordance with one embodiment of the invention.

FIG. 14 illustrates how the profiler 220 finds the users most likely to buy a particular product. The profiler 220 obtains from the data warehouse 210 a table of users sorted by preferences (or purchases) they have made. A set of preferences pertaining to the product to the marketed (e.g., interest in power athletics for interest in weightlifting equipment) is applied to the table of users versus preferences, which returns a subset of the users in the table most likely to be interested the product. It should be noted that the set of preferences pertaining to the product can be inferred from legacy data of the attributes and preferences of persons who have actually purchased similar products.

Figure 15:
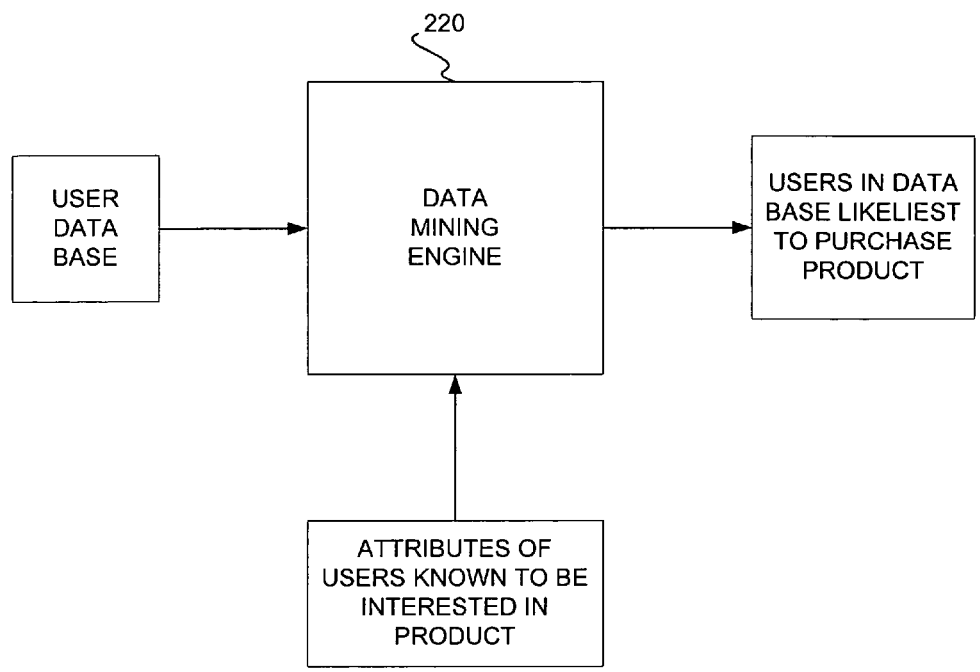
FIG. 15 is a diagram illustrating how results from a known database pertaining to a product are used to find likely prospects in another data base in accordance with an embodiment of the invention.

FIG. 15 illustrates how to mine an existing database with the results of the process of FIG. 14. First, the attributes of the subset of users most likely to purchase the product are statistically inferred. These attributes are then supplied to the data mining engine of the profiler 220. The profiler 220 then analyzes the user data base against this set of attributes and returns a list of the most likely users in the data base to purchase the product.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A method for managing a marketing campaign, comprising:

providing a data mining engine capable of being trained with training data; and capable thereafter of performing inferences relative to the training data and on additional data;

providing a user database containing observed characteristics of each one of a set of users, the characteristics comprising at least one of: (a) at least one of the user's attributes, (b) at least one of the user's preferences;

training the data mining engine with a set of training data comprising the user database by clustering the user database into different segments of users distinguished by different states of one or more characteristics;

inputting to the data mining engine a predetermined set of characteristics including a predetermined set of user attributes likely to pertain to a product to which the marketing campaign is directed and, in response thereto, obtaining from the data mining engine a subset of the users in the database having the highest correlation to the characteristic by determining which of the segments found during clustering of the user database has the highest statistical correlation to the predetermined set of characteristics;

determining in the data mining engine a set of prevalent attributes of the subset of users;

defining a target database of users and determining in the data mining engine a target subset of users in the target database statistically correlated to the set of prevalent attributes;

conducting a presently conducted marketing campaign cycle directed at the target subset of users;

observing and analyzing responses of the target subset of users to the presently conducted marketing campaign cycle at least partly in real-time;

forming a focused group of the target subset of users whose observed response was a particular type of response;

determining, in the data mining engine, a group of prevalent characteristics of the focused group of users; and defining a database to be mined and determining, in the data mining engine, a new set of users in the database to be mined whose characteristics are statistically correlated with the group of prevalent characteristics, determining, in the data mining engine, a complete set of statistically prevalent user attributes of the subset of users;

for any member of the subset of users having certain attributes which are undetermined in the user data base, filling in the certain undetermined attributes with the corresponding ones of the complete set of statistically prevalent user attributes of the subset of users.

2. The method of claim 1 wherein the target database comprises the user database with which the data mining engine has been trained.

3. The method of claim 1 wherein the target database comprises an additional database not included in the user database, the additional data base defining characteristics of a set of new users.

4. The method of claim 1 wherein the database to be mined comprises the user database with which the data mining engine was trained.

5. The method of claim 1 wherein the database to be mined comprises the target data base of users.

6. The method of claim 1 wherein the database to be mined comprises a new database not included in either the user data base nor in the target user database.

7. The method of claim 1 further comprising:
directing a subsequent marketing campaign cycle to the new set of users.

8. The method of claim 1 wherein the user preference corresponds to a prior purchase of a product which is a subject of the marketing campaign.

9. The method of claim 1 further comprising:
for any member of the target subset of users having certain attributes which are undetermined, filling in the certain undetermined attributes with the corresponding ones of the set of prevalent user attributes of the subset of users.

10. The method of claim 1 wherein clustering comprises:
providing with a visualization tool a tabulation of characteristics of each cluster with the probability of each characteristic in the cluster;
labeling each cluster with a statistically predominant characteristic thereof in accordance with the tabulation.

11. The method of claim 10 wherein the statistically predominant characteristic of each cluster distinguishes the cluster from the other clusters.

12. A machine-readable medium having instructions stored thereon for execution by a processor to perform a method comprising:

providing a data mining engine capable of being trained with training data and capable thereafter of performing inferences relative to the training data; and on additional data;

providing a user database defining the observed characteristics of each one of a set of users, the characteristics comprising at least one of: (a) at least one of the user's attributes, (b) at least one of the user's preferences;

training the data mining engine with a set of training data comprising the user database by clustering the user data base into different segments of user distinguished by different states of a characteristic;

inputting to the data mining engine a predetermined set of characteristics including a predetermined set of user attributes likely to pertain to a product to which the marketing campaign is directed and, in response thereto, obtaining from the data mining engine a subset of the users in the data base having the highest correlation to the characteristic by determining which of the segments found during clustering of the user database has the highest statistical correlation to the predetermined characteristic;

determining in the data mining engine a set of prevalent attributes of the subset of users;

defining a target database of users and determining in the data mining engine a target subset of users in the target data base statistically correlated to the set of prevalent;

conducting and analyzing a presently conducted marketing campaign cycle directed at the target subset of users at least partly in real-time;

observing responses of the target subset of users to the presently conducted marketing campaign cycle;

forming a focused group of the target subset of users whose observed response was a particular type of response;

determining, in the data mining engine, a group of prevalent characteristics of the focused group of users; and defining a database to be mined and determining, in the data mining engine, a new set of users in the database to be mined whose characteristics are statistically correlated with the group of prevalent characteristics, determining, in the data mining engine, a complete set of statistically prevalent user attributes of the subset of users;

for any member of the subset of users having certain attributes which are undetermined in the user data base, filling in the certain undetermined attributes with the corresponding ones of the complete set of statistically prevalent user attributes of the subset of users.

* * * * *